United States Patent
Zhang et al.

(10) Patent No.: US 9,118,522 B2
(45) Date of Patent: Aug. 25, 2015

(54) BROWSER BASED PEER TO PEER DISTRIBUTION SYSTEM

(75) Inventors: Xuan Zhang, Beijing (CN); Sen Hu, Beijing (CN)

(73) Assignee: QINGDAO YUN ZHONG NETWORKS LIMITED, Beijing (CN)

( * ) Notice: Subject to any disclaimer, the term of this patent is extended or adjusted under 35 U.S.C. 154(b) by 470 days.

(21) Appl. No.: 13/591,078

(22) Filed: Aug. 21, 2012

(65) Prior Publication Data

US 2013/0346626 A1   Dec. 26, 2013

Related U.S. Application Data

(60) Provisional application No. 61/664,623, filed on Jun. 26, 2012.

(51) Int. Cl.
| | |
|---|---|
| G06F 15/173 | (2006.01) |
| H04L 29/06 | (2006.01) |
| G06F 9/00 | (2006.01) |
| H04N 21/222 | (2011.01) |
| H04N 21/63 | (2011.01) |
| H04L 29/08 | (2006.01) |
| H04N 21/4788 | (2011.01) |

(52) U.S. Cl.
CPC ............ *H04L 29/06027* (2013.01); *G06F 9/00* (2013.01); *H04L 65/1069* (2013.01); *H04L 65/4084* (2013.01); *H04N 21/222* (2013.01); *H04N 21/632* (2013.01); *H04L 67/104* (2013.01); *H04N 21/4788* (2013.01)

(58) Field of Classification Search
CPC ................................ H04L 63/10; H04L 63/14
USPC .................................. 709/227, 229, 230, 231
See application file for complete search history.

(56) References Cited

U.S. PATENT DOCUMENTS

| | | | |
|---|---|---|---|
| 2002/0198929 A1* | 12/2002 | Jones et al. .................... | 709/201 |
| 2003/0105809 A1* | 6/2003 | Yoshii et al. ................... | 709/203 |
| 2008/0189757 A1* | 8/2008 | Schackow et al. ................ | 726/1 |
| 2012/0331441 A1* | 12/2012 | Adamson ....................... | 717/102 |

OTHER PUBLICATIONS

"Native Client: A Sandbox for Portable, Untrusted x86 Code" —Yee et al, Google Inc., Jun. 2009 http://static.googleusercontent.com/media/research.google.com/en/us/pubs/archive/34913.pdf.*

* cited by examiner

*Primary Examiner* — Randy Scott
(74) *Attorney, Agent, or Firm* — Perkins Coie LLP

(57) ABSTRACT

A method of operation of a media distribution system includes: streaming a media object from an external system via a first browser; receiving a media request from a viewer device; determining a confirmation of whether the media request is for the media object; and serving a portion of the media object from a sandboxed memory of the first browser for presenting on a second browser of the viewer device in response to the confirmation.

10 Claims, 6 Drawing Sheets

BROWSER BASED PEER TO PEER DISTRIBUTION SYSTEM

CROSS REFERENCE TO RELATED APPLICATION

This application claims the benefit of U.S. Provisional Patent Application Ser. No. 61/664,623 filed Jun. 26, 2012, and the subject matter thereof is incorporated herein by reference thereto.

FIELD OF INVENTION

This invention relates generally to an online distribution system, and in particular to providing an online media stream distribution system.

BACKGROUND

In recent years, consumers have enjoyed traditional media over the Internet. For example, with the advent of Internet radio and Internet TV, consumers have been using their Internet-enabled computers to listen to music and to watch videos. Contents that can be downloadable over the Internet include music, talk shows, presentations, interactive applications, games, video, audio books, other stream-enabled media, or any combination thereof. These contents are generally delivered to recipient devices through online distribution systems using proprietary distribution software and hardware.

The difficulty of an online distribution system is that as requestors for the media streams increase, the total available bandwidth decreases. For example, user experience for popular video stream services may be crippled by the popularity of the service.

Existing online distribution services have tried to improve their distribution services by proposing solutions to reduce the amount of data moved across the network. However, such improvements only mitigate the problem by reducing the inverse linear relationship between the number of users and bandwidth. As a result, user experience still declines as the number of users increase for a given online distribution service.

Specifically, users of online distribution systems do not have an effective tool to watch media files over the Internet. Providing users with efficient methods of delivering and streaming media files is valuable in providing a better user experience for users. However, existing systems have not provided users with tools or methods of presenting them with the most effective method of online media distribution.

DISCLOSURE OF INVENTION

The present invention provides a method of operating a media distribution system including: streaming a media object from an external system via a first browser; receiving a media request from a viewer device; determining a confirmation of whether the media request is for the media object; and serving a portion of the media object from a sandboxed memory of the first browser for presenting on a second browser of the viewer device in response to the confirmation.

In another embodiment, the present invention includes a method of operating a distribution server system including: providing a distribution application to a first viewer device for execution in a first browser application; scheduling a media object to be streamed to the distribution application; receiving a media request for the media object from a second viewer device; and scheduling a portion of the media object from the first viewer device to be served to a sandboxed memory of a second browser application on the second viewer device.

The present invention also provides a distribution node system including: a non-transitory memory including a first browser application; a processor for executing the first browser application; a distribution application for execution in the first browser application. The distribution application can comprise: a stream module for streaming a media object from an external system via the first browser application; a communication module for receiving a media request from a viewer device; a confirmation module, coupled to the stream module and the communication module, for determining a confirmation of whether the media request is for the media object; and a service module, coupled to the confirmation module, the communication module, and the stream module, for serving a portion of the media object from a sandboxed memory of the first browser application for presenting on a second browser of the viewer device in response to the confirmation.

In yet another embodiment, the present invention includes a distribution server system including: a non-transitory memory including a deployment module and a schedule module and a processor for executing the deployment module, the schedule module, or any combination thereof. The deployment module, in this embodiment, is for providing a distribution application to a first viewer device for execution in a first browser application; and the schedule module, in this embodiment, is for receiving a media request for a media object from a second viewer device and scheduling a portion of the media object from the first viewer device to be served to a sandboxed memory of a second browser application on the second viewer device.

Some embodiments of the invention have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention relates to methods of distributing media objects through viewer devices. The present invention includes a first viewer device that is streaming a media object from a media server or from another viewer device. The present invention can include a second viewer device that would like to stream the same media object. The present invention provides a way for the first viewer device to act as a server to stream portions of the media object received to the second viewer.

Figure 1:
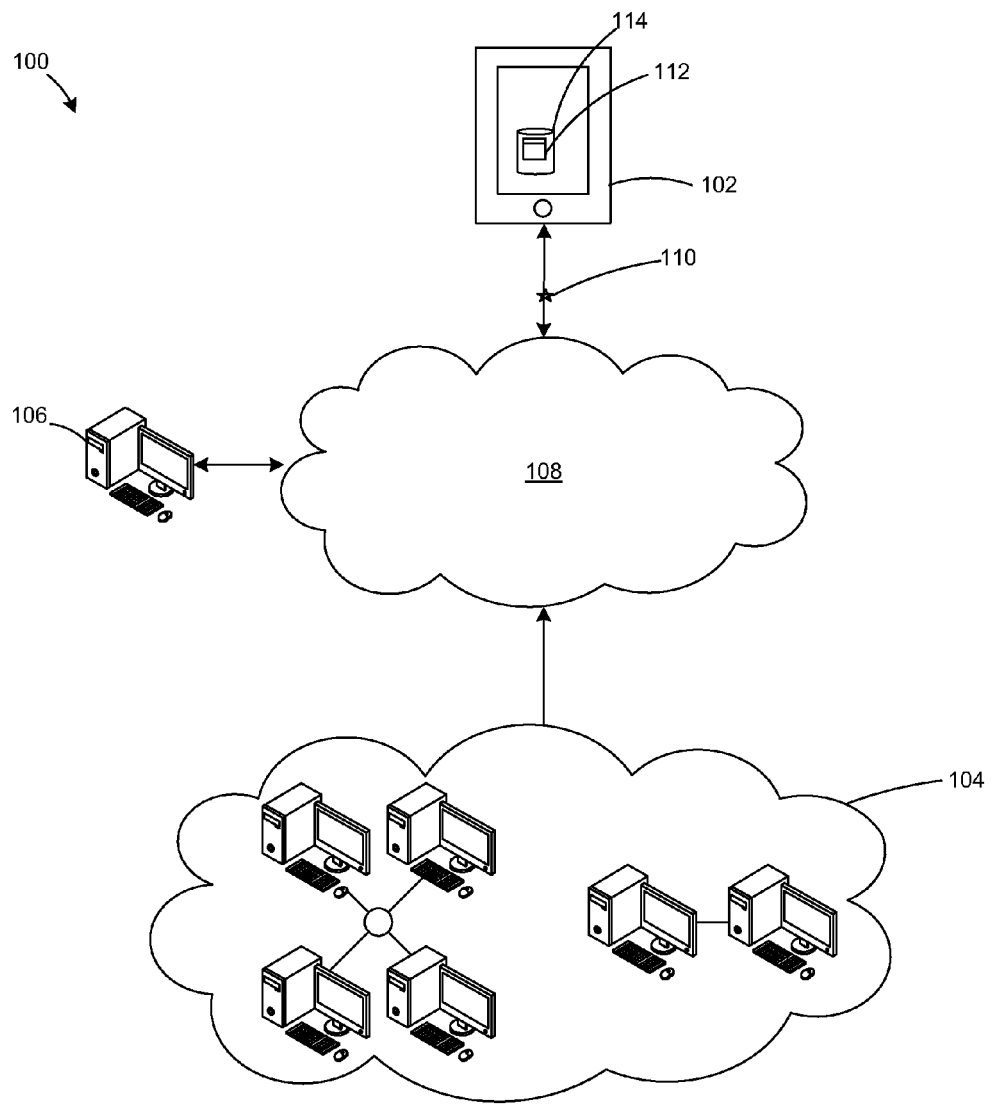
FIG. 1 illustrates a media distribution system, in accordance with an embodiment of the invention.

FIG. 1 illustrates a media distribution system 100, in accordance with an embodiment of the invention. The media distribution system 100 can be a peer to peer system capable of distributing media files between peer systems. The media distribution system 100 can be a browser-based distribution system. The media distribution system 100 can include a first viewer device 102 connected to a media server system 104 and a second viewer device 106 via a network channel 108. For example, the first viewer device 102, the media server system 104, or the second viewer device 106 can be a computer system described in FIG. 6.

The media server system 104 is defined as a computer system, including one or more devices for distributing media objects, such as a media object 110. The media object 110 is defined as any digital content capable of being played or presented by a digital device. For example, the media object 110 can be audio file, talk shows, presentations, interactive applications, games, video, audio books, other stream-enabled media, or any combination thereof. The media object 110 can have a sequential property, where when the media object 110 is played, the media object 110 has a set duration of time and where portions of the media object 110 correspond to pieces within a sequence in the set duration.

The media server system 104 can be a specialized computer server or can be a conventional computer system like the first viewer device 102 and the second viewer device 106. The first viewer device 102 and the second viewer device 106 can be a conventional computer system executing, for example, a Microsoft Windows-compatible operating system (OS), Apple OS X, and/or a Linux distribution. In another embodiment, the first viewer device 104 and the second view device 106 can be a device having computer functionality, such as a personal digital assistant (PDA), mobile telephone, smartphone, etc The network channel 108 is defined as a medium of communication. For example, the network channel can be an Ethernet or other wire-based network or a wireless NIC (WNIC) or wireless adapter for communicating with a wireless network, such as a WI-FI network. The network channel 108 can be any suitable network for any suitable communication interface. As an example and not by way of limitation, the communication channel 504 can be an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 108 can be a wireless PAN (WPAN) (such as, for example, a BLUETOOTH WPAN), a WI-FI network, a WI-MAX network, a 3G or 4G network, a cable internet network, a dial-up network, a digital subscriber line (DSL) network, a cellular telephone network (such as, for example, a Global System for Mobile Communications (GSM) network).

In one embodiment, the network channel 108 uses standard communications technologies and/or protocols. Thus, the network channel 108 can include links using technologies such as Ethernet, 802.11, worldwide interoperability for microwave access (WiMAX), 3G, 4G, CDMA, DSL, etc. Similarly, the networking protocols used on the network channel 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel 108 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The first viewer device 102 can include a distribution application 112. The second viewer device 106 can also include the distribution application 112. The media server system 104 can also include the distribution application 112.

The distribution application 112 can be software that is stored on a memory 114. The memory 114 is a non-transitory computer readable storage medium. The memory 114 can contain software that is executable on a computer system or a device with computer functionalities, such as the first viewer device 102, the second viewer device 106, or the media server system 104. The distribution application 112 can also be a hardware module or a collection of hardware modules with logic circuitry to perform the methods of distributing the media object 110 in accordance to the present disclosure. The distribution application 112 can be a cloud-based software ran from a remote server of a cloud computing environment.

The distribution application 112 can be stored on a non-transitory volatile memory, such as Random Access Memory (RAM). The distribution application 112 can be downloaded from a website onto the memory 114 of a host computer or a host device with a browser application on the host computer or the host device, hereinafter "the host." The distribution application 112 can be restricted in terms of access of the host on which it is operating from. For example, the distribution application 112 can be restricted from scanning, reading, or writing from and to a portion or all of any memory on the host. The distribution application 112 can be allotted a memory space on the memory 114 to store and process data for the distribution application 112.

The distribution application 112 can be a browser run-time instance application that is terminated when the browser instance is terminated or halted on the host computer or host device. Here, the browser is defined as a software application for retrieving, presenting, and traversing information resources on the World Wide Web. The browser is an application software designed to enable users to access, retrieve and view documents and other resources on the Internet. The browser instance is defined as a run-time construct of an executing browser software having a sandboxed memory space to operate in as allocated by an operating system.

The distribution application 112 can be implemented as a compiled application executable within the browser. The distribution application 112 can also be implemented as a script that can be interpreted for execution within the browser. For example, the distribution application 112 can be based in Flash, HTML 5, JavaScript, Java applet, other browser-based application, or any combination thereof.

Figure 2:
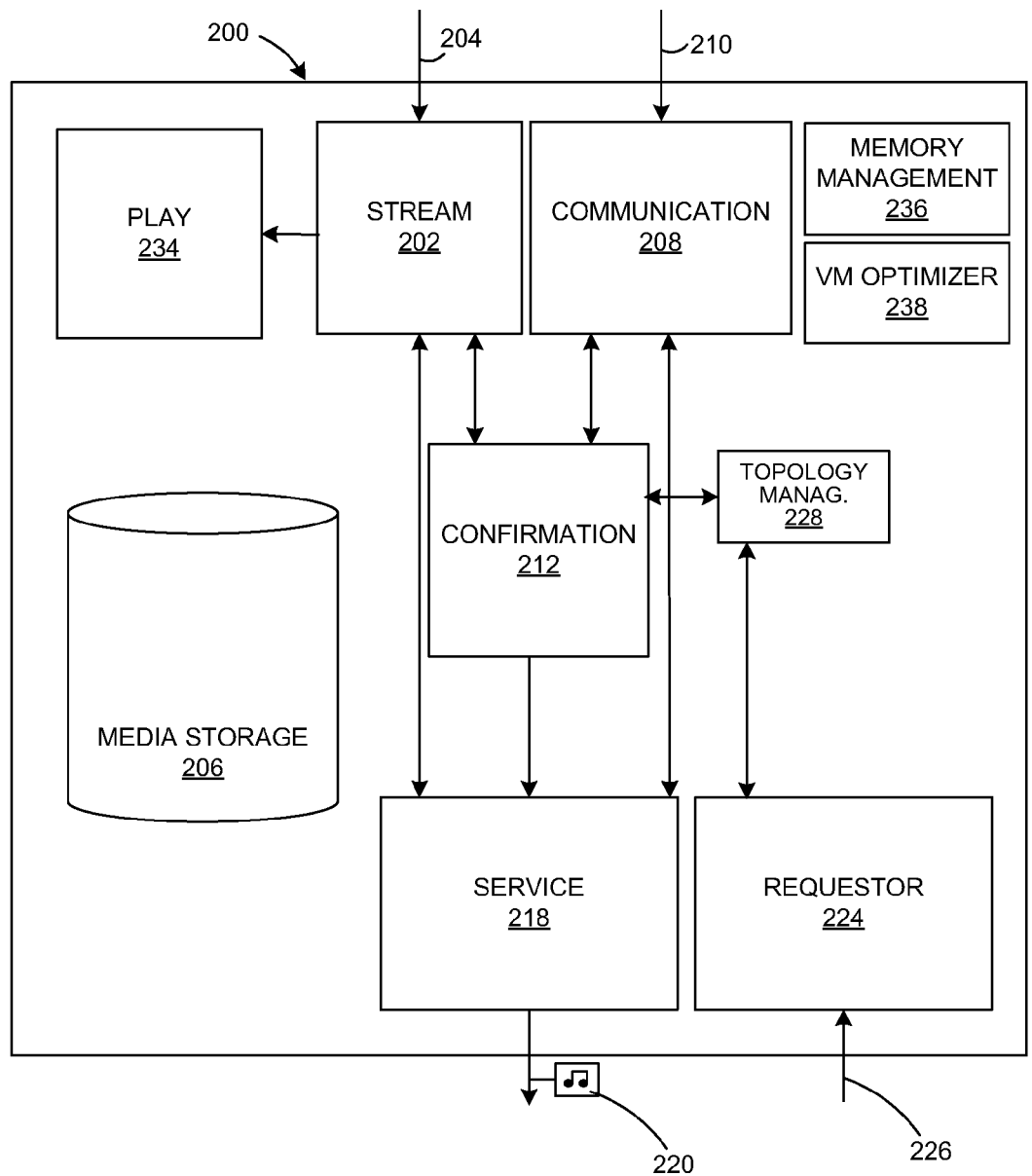
FIG. 2 illustrates a block diagram of modules of a media distribution node system, in accordance with another embodiment of the invention.

FIG. 2 illustrates a block diagram of modules of a media distribution node system 200, in accordance with another embodiment of the invention. For example, the media distribution node system 200 can be part of the media distribution system 100 of FIG. 1 as implemented on the first viewer device 102 of FIG. 1, the second viewer device 106 of FIG. 1, the media server system 104 of FIG. 1, or any combination thereof.

The media distribution node system 200 can include one or more methods of distributing media objects via a distribution application from and/or to a view device. The distribution application can be distributed from a computer system, such as the computer system of FIG. 6, to viewer devices, such as the first viewer device 102 of FIG. 1 or the second viewer device 106 of FIG. 1. The one or more methods can be implemented by components, storages, or modules described below. The components and modules can be implemented as hardware modules, software modules, or any combination thereof. For example, the modules described can be software modules implemented as instructions on a non-transitory memory capable of being executed by a processor or a controller on a machine.

The modules can be implemented as hardware modules, software modules, or any combination thereof. For example, all or some of the modules can be implemented as part of the distribution application 112 of FIG. 1. For example, the modules described can be software modules implemented as instructions on a non-transitory memory capable of being executed by a processor or a controller on a machine described in FIG. 6.

The storages or "stores", described below are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications.

The media distribution node system 200 can include additional, fewer, or different modules for various applications. Conventional components such as network interfaces, security functions, load balancers, failover servers, management and network operations consoles, and the like are not shown so as to not obscure the details of the system.

The media distribution node system 200 can include a stream module 202. The stream module 202 is for streaming a media object 204. The stream module 202 can reside on a viewer device, such as the first viewer device 102 of FIG. 1.

The stream module 202 can be for streaming the media object 204 via a browser from a server system, such as the media object 110 of FIG. 1 from the media server system 104. For example, the stream module 202 can stream a portion of a video with a Flash™ application running on a Chrome™ browser from a video service provider and a portion of the video with the same Flash™ application from a viewer device running the same Flash Application™ on a Mozilla™ browser. The streaming can include downloading the media object 204 in sequential time chunks. Alternatively, the streaming can include downloading the media object 204 in parallel, such as downloading different time chunks from different sources, giving bandwidth priority to earlier time chunks in sequence.

The stream module 202 can store the media object 204 on a media storage space 206. The media storage space 206 is a portion of memory allocated from a memory storage of the media distribution node system 200, such as the memory 114 of FIG. 1, with access privileges for the modules of the media distribution node system 200.

The media distribution node system 200 can include a communication module 208. The communication module 208 is for communicating between devices, such as between a media server system 104 of FIG. 1 and the media distribution node system 200 and between devices of the media distribution system 100 of FIG. 1. The communication module 208 can be for receiving a media request 210 from a viewer device implementing methods or modules of the media distribution node system 200, such as the second viewer device 106 of FIG. 1.

The media request 210 is a digital package that specifies a media object of which the requestor would like to stream. The media request 210 can also include which portion of the media object specifically that the requester would like to stream. For example, the media request 210 can be generated for the media object 204. For another example, the media request 210 can be generated for the first three seconds portion of a video. The media request 210 can include a media file ID, a physical location of the requestor, an Internet Protocol (IP) address of the requestor, a device type of the requestor, an operating system type of the requestor, a file type of the media object, or any combination thereof.

The communication module 208 can reside on a viewer device, such as the first viewer device 102. For example, the communication module 208 can be for communicating between the first viewer device 102 and the second viewer device 106, including communicating the media request 210 from the second viewer device 106 to the first viewer device 102. Alternatively, the media request 210 can be sent from the requesting viewer device to the media server system, and then forwarded to the communication module 208 of the receiving viewer system.

The media distribution node system 200 can include a confirmation module 212, coupled to the stream module 202 and the communication module 208. The confirmation module 212 can reside on a viewer device, such as the first viewer device 102 or the second viewer device 106. The confirmation module 212 is for determining whether to service the requesting viewer device, such as the second viewer device 106.

The confirmation module 212 can communicate with the media server system 104 of FIG. 1 to verify that the media request 210 came from a requesting viewer device that is registered with the media server system 104. The confirmation module 212 can determine whether to service the requesting viewer device based on whether the media request 210 is for the media object 204. The confirmation module 212 can determine whether to service the requesting viewer device by calculating a distance between the requesting viewer device and a physical location of the media distribution node system 200.

For example, a request for a MP3 song called "Morning Melody" can be received at the communication module 208 of the media distribution node system 200. The confirmation module 212 can determine that "Morning Melody" is being streamed on the media distribution node system 200. The confirmation module 212 can further determine that the requesting viewer device is on a different continent and more than 1000 miles apart from the media distribution node system 200. The confirmation module 212 can determine that although the request is for the media object "Morning Melody" being streamed to the receiver viewer device, the receiver viewer device still should not service the requesting viewer device because it is beyond a distance threshold.

For example, the confirmation module 212 can be for determining whether the media request 210 from the second viewer device 106 is for the media object 204 stored and streamed on the first viewer device 102. The confirmation module 212 of a servicing viewer device can determine whether to service the requesting viewer device based on a property or attribute of the servicing viewer device, the requesting viewer device, or any combination thereof. For example, the property can include available bandwidth, available processing power, available memory size, operating system type, or any combination thereof. The confirmation module 212 can determine whether to service the requesting viewer device based on properties of both the requesting viewer device and the media distribution node system 200.

For example, the confirmation module 212 of a servicing viewer device can determine that a requesting viewer device must have a Windows™ operating system with at least 500 MB of memory and a download speed faster than the servicing viewer device. The servicing viewer device may have an upload speed of 5 MBPS. A requesting viewer device may have a Windows XP™ platform with 1 GB of memory and 6 MBPS download speed. The requesting viewer device in this case may qualify to be serviced by the servicing viewer device as determined by the confirmation module 212.

The media distribution node system 200 can include a service module 218 coupled to the confirmation module 212, the communication module 208, and the stream module 202. The service module 218 is for serving a first portion 220 of the media object 204 to the viewer device when the media request 210 is determined to be for the media object 204. The first portion 220 of the media object 204 can be specified in the media request 210. The size of the first portion 220 can also be determined based on a property of the media distribution node system 200, such as available bandwidth, available processing power, available memory, or any combination thereof.

The service module 218 can reside on a viewer device, such as the first viewer device 102. For example, the service module 218 can be for serving the first portion 220 of the media object 204 from the first viewer device 102 to the second viewer device 106.

The media distribution node system 200 can include a request module 224. The request module 224 is for requesting and receiving a second portion 226 of the media object 204. The second portion 226 can be determined by selecting a portion from missing portions of the media object 204 yet to be downloaded. The request module 224 can include sending the media request 210 to a target viewer device. The request module 224 can select the target viewer device.

For example, the request module 224 can request the first three seconds of a music file that has not been received yet. For another example, the request module 224 can prioritize to request a portion earliest in time sequence from the missing portions of the media object 204.

A viewer device can be selected as the target viewer device based on properties of the target viewer device. The target viewer device can be directly recommended by a media server system, such as the media server 104 of FIG. 1. The target viewer device can also be selected with the assistance of a topology management module 228.

For example, the request module 224 can determine that the first viewer device 102 of FIG. 1 has the most available bandwidth out of all of the viewer devices having the media object 204 of interest. Hence, the first viewer device 102 may be designated as the target viewer device by the request module 224.

Although not shown in the figures, the request module 224 can be coupled to the stream module 202. After the media request has been accepted, the stream module 202 can start streaming the requested media object from the target viewer device.

The media distribution node system 200 can include a topology management module 228. The topology management module 228 is for managing an arrangement of how data flows between the media distribution node system 200 and other viewer devices connected to the media distribution node system 200. The topology management module 228 can determine the neighbor of each peer, such as the media distribution node system 200. For example, the media distribution node system 200 can execute the topology management module 228 to determine which other viewer device node it would like to connect with and if it will reject certain connection requests.

In determining which target viewer devices to request portions of the media object 204 via the media request 210, the topology management module 228 can utilize detail information of the viewer devices connected to the media server system 104. The detail information includes bandwidth, CPU speed, geolocation, Internet Service Provider, and any combination thereof. Although the topology management module 228 has been illustrated to reside on the media distribution node system 200, the whole or portions of the topology management module 228 can also reside on the media server system 104 of FIG. 1.

For example, the target viewer device can be selected based on its physical location relative to the requesting viewer device, its IP address, available bandwidth, processing power, available memory, operating system type, or any combination thereof. The properties of the target viewer device can be read from a central server or can be determined in an ad-hoc basis by traversing a peer to peer network.

The media server can send a list of target viewer device candidates to the topology management module 228. The topology management module 228 can then determine locally whether to accept those candidates as the target viewer devices.

The topology management module 228 can be coupled to the requestor module 224 to discover better neighbor candidates to act as the target viewer device. "Neighbor candidates" are viewer devices within a peer-to-peer network with the media distribution node system 200 that may be physically or virtually close to the media distribution node system 200. The topology management module 228 can remove connections made by the request module 224. The topology management module 228 can also make recommendations or dictate the target viewer devices for the request module 224.

The topology management module 228 can be coupled to the confirmation module 212. For example, the topology management module 228 can receive all media requests, such as the media request 210, from the other viewer devices, and determine which of the media requests to fulfill. The determination of whether to fulfill the media requests can be based on properties or attributes of either the requesting viewer device or the media distribution node system 200. The properties or attributes considered can be the same as for selecting or determining the target viewer devices.

The media distribution node system 200 can include a play module 234. The play module 234 is for playing the media object 204. The play module 234 can be coupled to the stream module 202. The play module 234 can include hardware control for displaying an image or a video through a browser application. The play module 234 can also include hardware control for playing an audio through a browser application.

The media distribution node system 200 can also include a memory management module 236 and a virtual machine (VM) optimizer module 234. The modules described in FIG. 2 can be software modules as implemented in the distribution application on a non-transitory memory. The distribution application can be downloaded via an instance of a web browser application by specifying an Internet Protocol (IP) address or entering a Uniformed Resource Locator (URL) address. Once downloaded, the web browser application may allocate a sandboxed memory space for the distribution application to operate in, such as the media storage space 206, including a sandboxed volatile memory space, a sandboxed non-volatile memory space, or any combination thereof.

The memory management module 236 is for facilitating the use of the sandboxed memory space. For example, the stream module 202 may be downloading portions of the media object 204 to the sandboxed memory space. The memory management module 236 can halt the streaming if the sandboxed memory space becomes full. The memory management module 236 can also compress stored content in the sandboxed memory space when the sandboxed memory space is beyond a threshold percentage of being full. The memory management module 236 can selectively delete portions of the media object 204 stored in the sandboxed memory space once that portion has been played to the user and/or serviced to a requesting viewer device.

The sandboxed memory space for operating the media distribution node system 200 has been discovered to provide a safe environment for users in a peer-to-peer distribution network. Because the memory space is sandboxed to the browser instance, there is no risk of a viewer getting a virus through the over media distribution network system.

The memory management module 236 can communicate with the media server to determine what portions of the media object 204 to cache in memory after the portions have been played by the play module 234. For example, the media server can recommend to the memory management module 236 to store less of the media object 204 when there are a lot of viewer devices watching the media object 204 or to store more of the media object 204 when there are not as many viewer devices watching the media object 204.

The VM optimizer module 238 is for optimizing the modules disclosed in FIG. 2 to run on the media distribution node system 200. For example, the VM optimizer module 238 may be for Flash VM optimization or for JavaScript VM optimization. The VM optimizer module 238 can pipeline the instructions from the modules. The VM optimizer module 238 can cache or group the instructions from the modules. The VM optimizer can predict or combine conditional branch instructions of the modules.

Accordingly, embodiments of the invention comprises a technical solution (streaming a portion of the media object from a first browser to a second browser) that solves a technical problem (apportioning limited computer resources such as processing power, bandwidth, storage), adopt one or more technical means (e.g., service module 218, which can include an application specific integrated circuit (ASIC), and/or software with processor to execute same, etc.) and produce a technical effect (e.g., quicker computer processing, data transmission, efficient data storage, and data broadcast, etc.).

Figure 3:
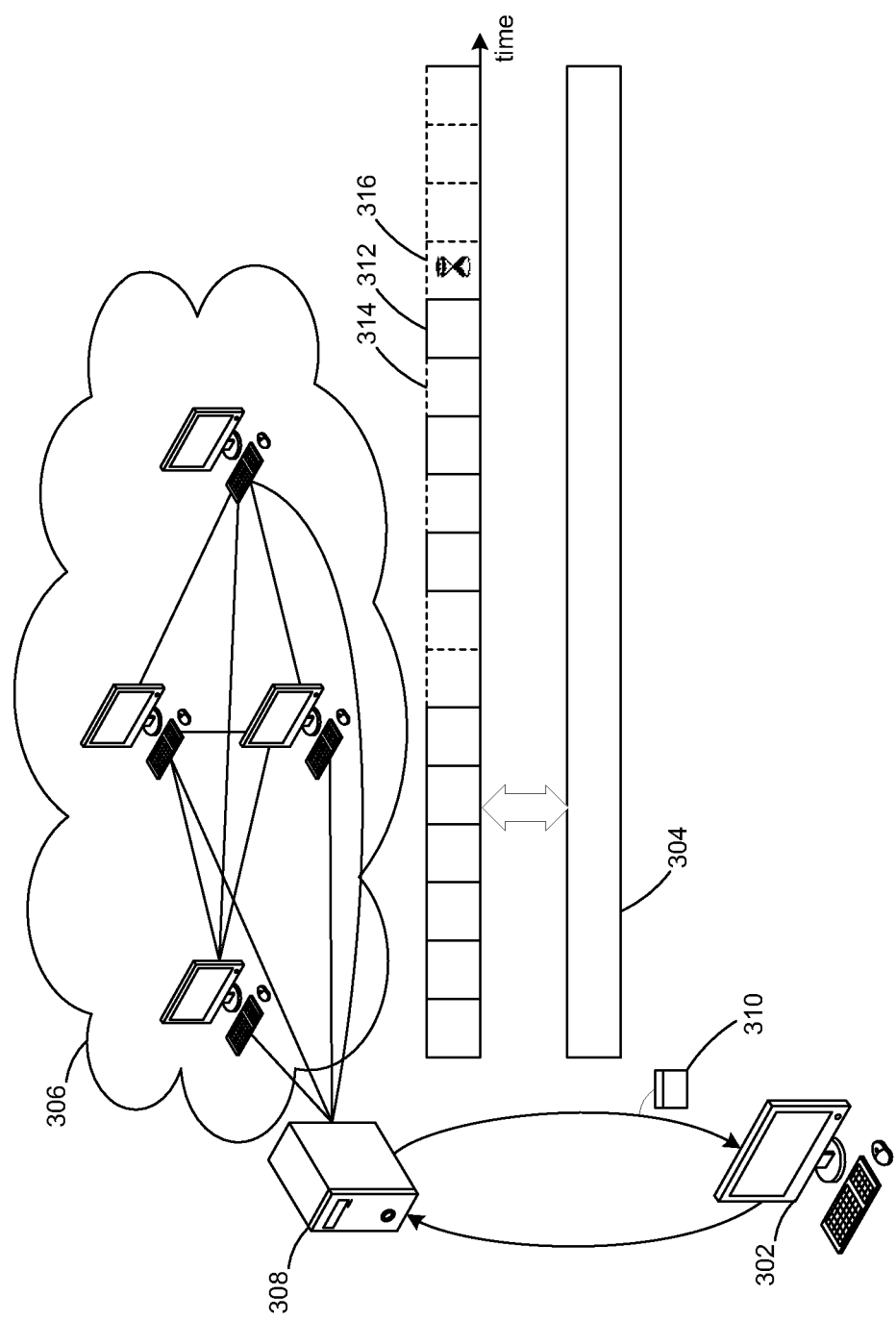
FIG. 3 illustrates an example of a requester viewer device parallel streaming a media object from a network of viewer devices.

Referring now to FIG. 3, therein is shown an example of a requester viewer device 302 parallel streaming a media object 304 from a network of viewer devices 306. The requester viewer device 302 can be the first viewer device 102 of FIG. 1, the second viewer device 106 of FIG. 1, or the media distribution node system 200 of FIG. 2. The media object 304 can be the media object 110 of FIG. 1 or the media object 206 of FIG. 2. The viewer devices 306 can include the first viewer device 102 of FIG. 1, the second viewer device 106 of FIG. 1, the media distribution node system 200 of FIG. 2, or any combination thereof.

The requester viewer device 302 is illustrated to be connected to a distribution server system 308. The connection can be made when a user of the requester viewer device 302 access the URL of the distribution server system 308. The distribution server system 308 can be a computer system as described in FIG. 6. The distribution server system 308 can be the media server system 104 of FIG. 1. The distribution server system 308 is for managing the network of the viewer devices 306 for distributing media objects. The distribution server system 308 can send a distribution application 310 to the requester viewer device 302.

The distribution application 310 is a software application for selecting the media object 304 to stream and play, and for facilitating the downloading and uploading of portions of the media object 304. The distribution application 310 can be executable on or interpreted by a browser application instance running on the requester viewer device 302. The distribution application 310 can be the distribution application 112 of FIG. 1. The distribution application 112 can provide the requester viewer device 302 with a list of available media objects to stream or download. Alternatively, the distribution application 112 can provide the requester viewer device 302 with an interface to find, search, select, or randomly select one or more of the media object to stream or download. Once downloaded, the distribution application 310 can facilitate servicing other viewer devices with the media object 304 already downloaded to the requester viewer device 302.

The media object 304 is illustrated as having many portions. The size of each of the portions can be uniform. The time length of each of the portions can be uniform. Alternatively, the size or the time length of each of the portions can be determined by the distribution application 310.

For example, a downloaded portion 312, a missing portion 314, and a loading portion 316 are illustrated in FIG. 3. The downloaded portion 312 is a portion of the media object 304 that has been retrieved from either the distribution server system 308 or one or more of the viewer devices 306. The missing portion 314 is a portion of the media object 304 that is not stored on the requester viewer device 302. The loading portion 316 is a portion of the media object 304 that is being retrieved from the distribution server system 308 or one or more of the viewer devices 306.

Figure 4:
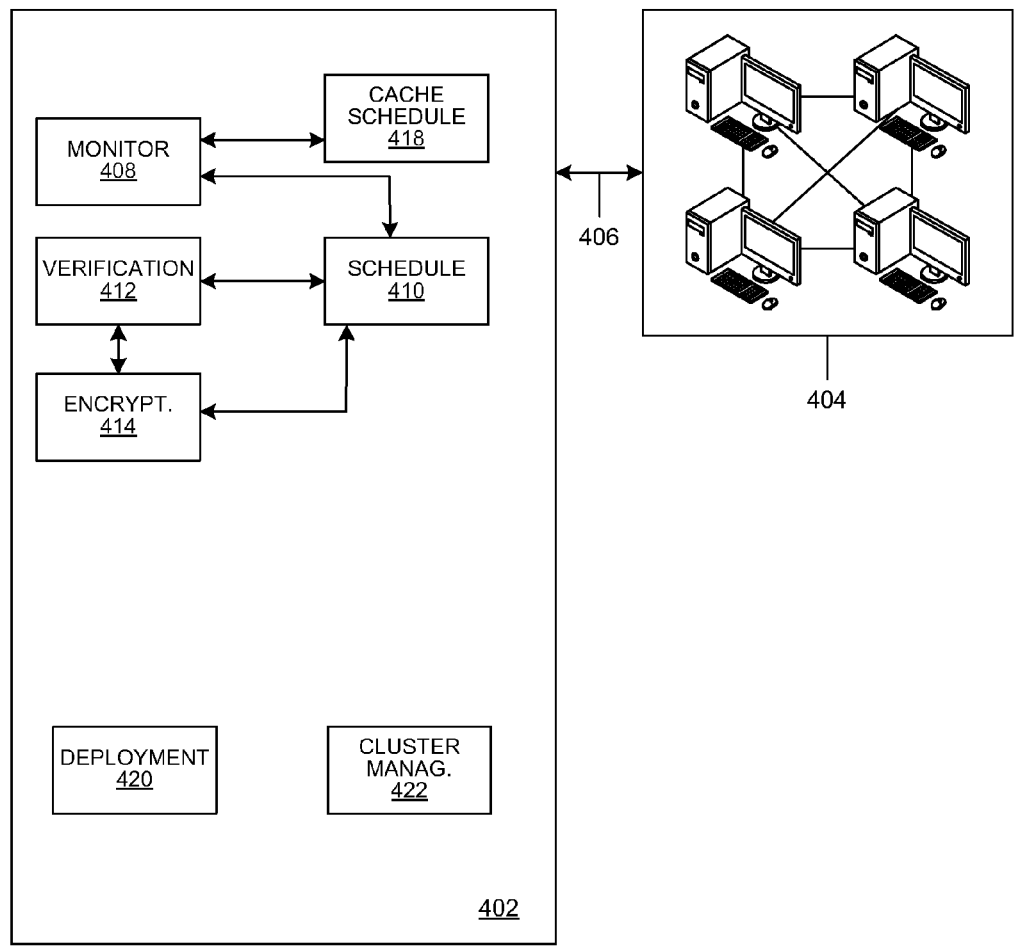
FIG. 4 illustrates a block diagram of modules of a distribution server system connected to viewer devices, in accordance with another embodiment of the invention.

Referring now to FIG. 4, therein is shown a block diagram of modules of a distribution server system 402 connected to viewer devices 404, in accordance with another embodiment of the invention. The distribution server system 402 is for distributing media objects and distribution applications, such as the media object 110 and the distribution application 112.

The distribution server system 402 can be the media server system 104 of FIG. 1. The distribution server system 402 can include one or more methods of distributing media objects via a distribution application from and/or to a view device. The one or more methods can be implemented by components or modules described below. The components and modules can be implemented as hardware modules, software modules, or any combination thereof. For example, the modules described can be software modules implemented as instructions on a non-transitory memory capable of being executed by a processor or a controller on a machine.

The modules can be implemented as hardware modules, software modules, or any combination thereof. For example, all or some of the modules can be part of the distribution application 112 of FIG. 1. For example, the modules described can be software modules implemented as instructions on a non-transitory memory capable of being executed by a processor or a controller on a machine described in FIG. 6.

The distribution server system 402 can include additional, fewer, or different modules for various applications. Conventional components such as network interfaces, security functions, load balancers, failover servers, management and network operations consoles, and the like are not shown so as to not obscure the details of the system.

The distribution server system 402 can be connected to a network of the viewer devices 404 via a network channel 406.

The view devices network 402 can include the viewer devices 306 of FIG. 3, the first viewer device 102 of FIG. 1, the second viewer device 106 of FIG. 1, the media distribution node system 200 of FIG. 2, or any combination thereof. The network channel 406 can be the network channel 108 of FIG. 1.

The distribution server system 402 can include a monitor module 408. The monitor module 408 is for monitoring the state of each of the viewer devices 404. The monitor module 408 can perform a bandwidth test on each of the viewer devices 404. The bandwidth test can include an upload speed test, a download speed test, a packet error rate test, or any combination thereof. The monitor module 408 can also perform a distance calculation between any or each pair of devices of the viewer devices 404.

The monitor module 408 can perform a functional test of each of the viewer devices 404. For example, the functional test can include an internet connection test, a video playability test, a graphics capability test, an audio capability test, a webcam capability test, or any combination thereof.

The monitor module 408 can provide statistics of a media distribution system that the distribution server system 402 is managing, such as the media distribution system 100 of FIG. 1. For example, the monitor module 408 can provided statistics on the overall system or on a per-viewer-device basis, a per-media-object basis, a per-physical-or-virtual-region basis, a per-media-type basis, or any combination thereof. The statistics can included a number of viewer devices connected, a buffer ratio, a bandwidth graph, a viewer devices distance graph, or any combination thereof.

The monitor module 408 can also determine statistics of the stream servicing tasks performed on the media distribution system. For example, the monitor module 408 can determine how many of the media objects are downloaded via the peer-to-peer network in the media distribution system, such as the network of the viewer devices 306 of FIG. 3, and how many of the media objects are downloaded via a content delivery network (CDN). The monitor module 408 can also determine an average number of peer viewer devices used to service the streaming or downloading of a single media object to a single viewer device.

The monitor module 408 can display the determined statistics on a real-time monitoring dashboard. The monitoring dashboard can be a hardware display such as a computer monitor, a touch screen, a mobile application on a mobile device, a webpage hosted by the distribution server system 402, or any combination thereof. The dashboard can be displayed on a access-restricted page, including a webpage or a networked interface, to a technical team of providers or distributors of the media objects, including the operator of the distribution server system 402. The dashboard can be access restricted, accessible only to registered members of the technical team on the distribution server system 402.

The monitor module 408 can send a notification via email, text message, or a notification window on the monitoring dashboard when one of the computer systems of the distribution server system 402 fails. Failure includes losing Internet connection, powering down, lagging, unresponsive, or any combination thereof.

The distribution server system 402 can include a schedule module 410. The schedule module 410 is for scheduling uploads of portions of a media object from one viewer device of the viewer devices 404 to another viewer device of the viewer devices 404. The schedules made can be sent to the viewer devices 404 as proposals or recommendations. The final decision of who each device requests portions of the media object from and who each device services the portions to can be made at each of the viewer devices 404. The schedule module 410 can be coupled to the monitor module 408 to receive bandwidth and functional capability information about the one viewer device and/or the another viewer device to determine the priority of scheduling. The schedule module 410 can be for scheduling one or more portions of a media object on the distribution server system 402 to be streamed directly or indirectly to one viewer device of the viewer devices 404. For example, the schedule module 410 can send the recommended schedules to the topology management module 228 of FIG. 2.

The schedule module 410 can receive a media request for a media object from a requesting viewer device. The schedule module 410 can determine whether the media request is for the entire media object, portions of the media object, or a portion of the media object. The schedule module 410 can determine one or more servicing viewer devices to stream requested portion or portions of the media object to a sandboxed memory of a browser application on the requesting viewer device.

The servicing viewer devices can be selected based on properties of the servicing viewer devices. For example, the servicing viewer device can be selected based on its physical location relative to the requesting viewer device, its IP address, available bandwidth, processing power, available memory, operating system type, or any combination thereof. The properties of the servicing viewer device can be read from a central server or can be determined in an ad-hoc basis by traversing a peer to peer network. The topology strategy and the list of the servicing viewer devices can be sent to the topology management module 228. The topology management module 228 can then determine whether to select the specific recommended servicing viewer devices based on local viewer device information.

The distribution server system 402 can include a verification module 412. The verification module 412 is for verifying that a viewer device is part of a recognized network of viewer devices. The verification module 412 can register a viewer device to be part of the recognized network. For example, the verification module 412 can store hash values of each of the viewer devices 404 running the distribution application. The verification module 412 can verify a registration of a requesting viewer device for a media object in response to receiving a media request for the media object.

The verification module 412 can be coupled to the schedule module 410. The verification module 412 can verify a registration of a serving viewer device before scheduling the serving viewer device to serve a portion of a media object to the requesting viewer device. The verification module 412 can verify by comparing a hash value received from a viewer device to a list of registered hash values.

The distribution server system 402 can include an encryption module 414. The encryption module 414 can be coupled to the schedule module 410. The encryption module 414 is for encrypting content delivered from the distribution server system 402 to a viewer device of the viewer devices 404. The encryption can be triggered by scheduling of a portion of a media object to be streamed from the distribution server system 402 to a viewer device as dictated by the schedule module 410. The encryption module 414 can encrypt contents delivered such that all subsequent delivery or replication of the delivered content would be encrypted. The encryption module 414 can store an encryption key on the distribution server system 402 for retrieval upon request. For example, the encryption module 414 can return the encryption key to a requesting viewer device when the verification module 412 confirms that the requesting viewer device is registered with the distribution server system 402.

The distribution server system 402 can include a cache schedule module 418. The cache schedule module 418 is for determining or scheduling what portions of a media object to cache on the viewer devices 404. For example, considering if each peer would have 50-500 MB active memory caching the portions of the media objects it downloaded, the peer-to-peer network would have a large distributed memory (50-500 MB time the number of peer view devices). Cache scheduling is a way to direct the peer-to-peer viewer device nodes to manage their memory with special consideration on volatile property of memory.

As a specific example, we may have 100,000 peers watching a 1 GB movie (the media object), and each peer may have 100 MB memory. The cache schedule module 418 can help each of the viewer devices 404 determine a different portion of the 1 GB movie to cache for a better sharing result. Instead of caching the beginning 100 MB of the movie on each peer, the cache schedule module 418 can instruct 10,000 of the viewer devices 404 to cache the first 100 MB of the movie, another 10,000 peers to cache the second 100 MB of the movie and so on.

The cache schedule module 418 can determine or recommend for each peer what portion of the media object to cache. The division of use of cache can be based on statistics of the monitor module 408. For example, the division of use of cache can be based on peer arrive/leave statistics (with consideration of volatile property of memory), media object statistics, sharing statistics, geolocation of the viewer devices 404, peer network statistics, other factors, or any combination thereof. The cache schedule module 418 can send the determined or recommended cache schedule to the memory management 236 of FIG. 2. The memory management module 236 can then determine whether to execute the recommended schedule.

The distribution server system 402 can include a deployment module 420. The deployment module 420 is for providing a distribution application, such as the distribution application 112 of FIG. 1, to a viewer device of the viewer devices 404 for execution in a browser application. The distribution application, once executing in or being interpreted by a browser application on the viewer device, can receive schedules for uploading or downloading portions of media objects from the schedule module 410. The deployment module 420 can also be for updating instructions, modules, schedules, other contents, or any combination thereof to the distribution application to the viewer device.

The distribution server system 402 can include a cluster management module 422. In one embodiment of the invention, the distribution server system 402 can be a cluster of computer systems, such as computer systems described in FIG. 6. The cluster management module 422 is for managing the cluster of the computer systems. The cluster management module 422 can be responsible for load-balancing the clusters. The cluster management module 422 can perform fault-tolerance management functions.

For example, for fault-tolerance management, the cluster management module 422 can perform DNS round-robin of the computer systems. The cluster management module 422 can also execute commands for unit recovery for a computer system that goes down. The cluster management module 422 can also execute replacement commands to locate a substitute computer system to take over the tasks of a failed computer system.

Figure 5:
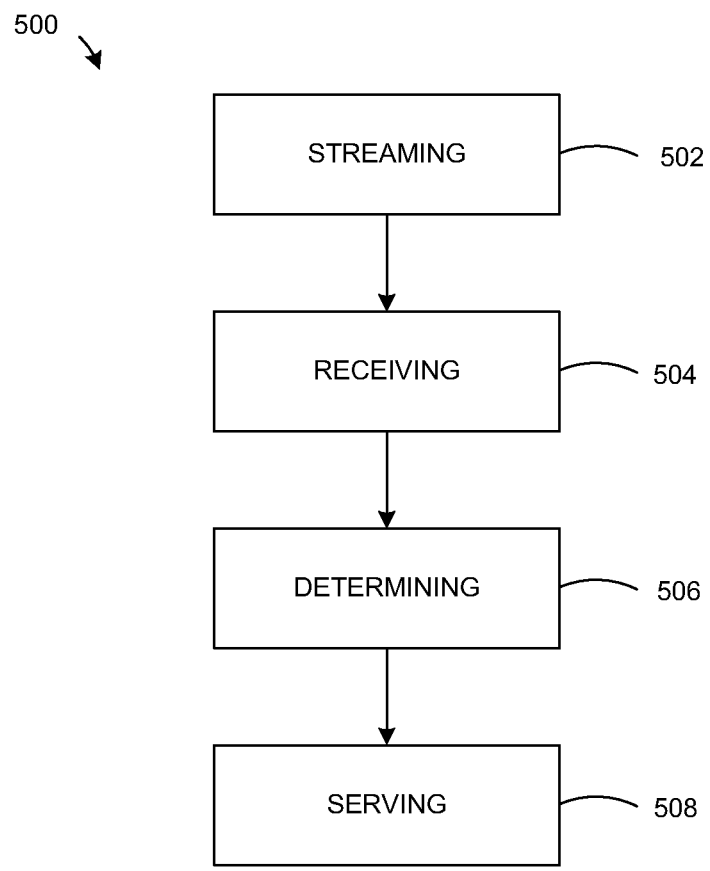
FIG. 5 is a flow chart of a method of operating a media distribution system, such as the media distribution system of FIG. 1, in a further embodiment of the present invention

Referring now to FIG. 5, therein is shown a flow chart of a method 500 of operating a media distribution system, such as the media distribution system 100 of FIG. 1 or the media distribution node system 200 of FIG. 2, in a further embodiment of the present invention. The method 500 includes: streaming a media object from an external system via a first browser in a method step 502; receiving a media request from a viewer device in a method step 504; determining a confirmation of whether the media request is for the media object in a method step 506; and serving a portion of the media object from a sandboxed memory of the first browser for presenting on a second browser of the viewer device in response to the confirmation in a method step 508.

Figure 6:
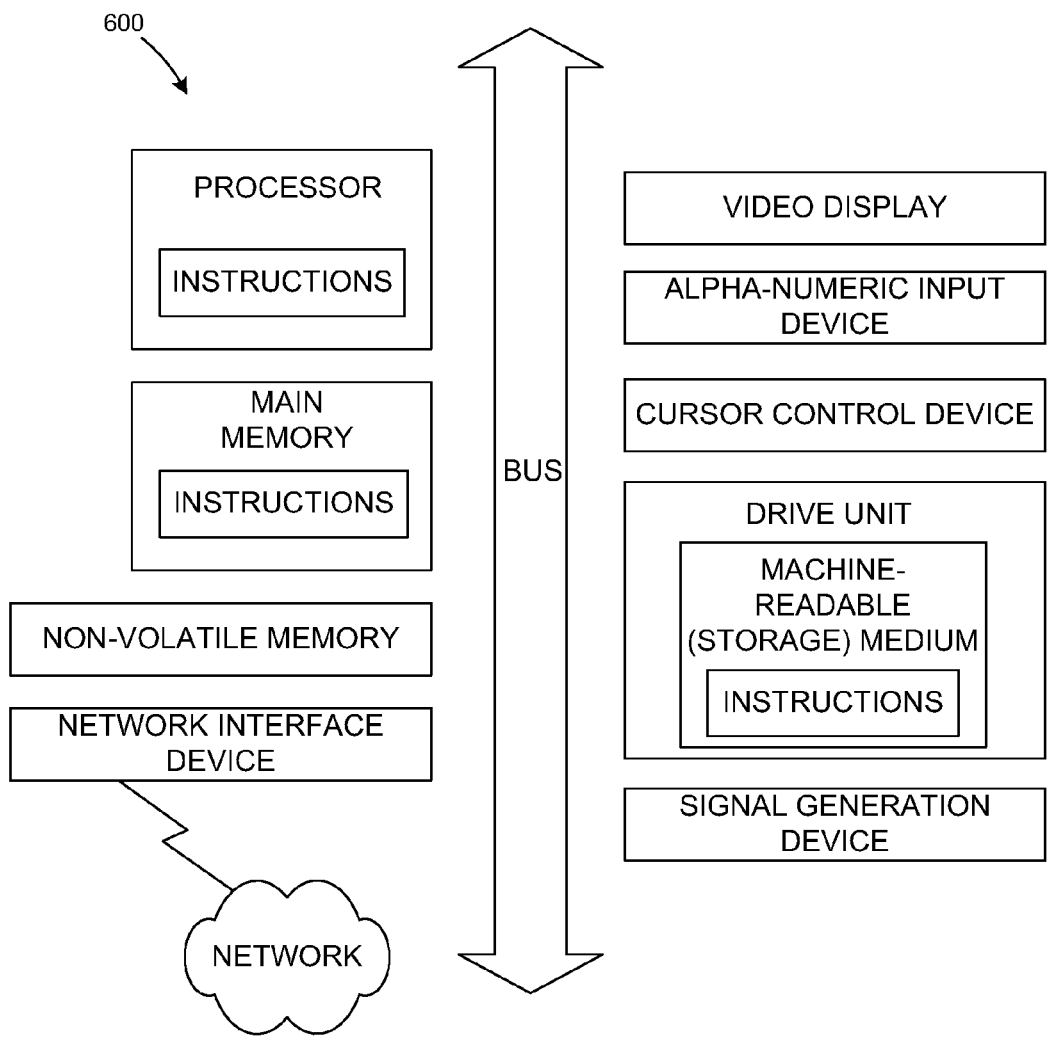
FIG. 6 is a diagrammatic representation of a machine in the example form of a computer system within which a set of instructions, for causing the machine to perform any one or more of the methodologies or modules discussed herein, may be executed.

Referring now to FIG. 6, therein is shown a diagrammatic representation of a machine in the example form of a computer system 600 within which a set of instructions, for causing the machine to perform any one or more of the methodologies or modules discussed herein, may be executed. The computer system 600 can be an example of the first viewer device 102 of FIG. 1, the second viewer device 106 of FIG. 1, or the media server system 104 of FIG. 1.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIGS. 1-4 (and any other components described in this specification) can be implemented. The computer system 600 can be of any applicable known or convenient type. The components of the computer system 600 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers)

when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The present invention is implemented with at least one electronic device or machine, such as the computer system 600. The present invention physically transforms the hardware storages of each of the machines used in implementing the present invention by downloading and storing at least a portion of a media object on non-transitory storage medium. Further, the present invention physically transforms the machines used for implementation in terms of change in temperature and power consumption by utilizing processing and communication bandwidth associated with the viewer devices. The end result of the invention would change the physical temperature and power consumptions of machines involved.

CLARIFICATION

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of operating a distribution server system comprising:
   providing a distribution application to a first viewer device for execution in a first browser application;
   scheduling a media object to be streamed to the distribution application;
   receiving a media request for the media object from a second viewer device; and
   scheduling a portion of the media object from the first viewer device to be served to a sandboxed memory of a second browser application on the second viewer device.

2. The method of claim 1, further comprising verifying a registration of the second viewer device in response to receiving the media request.

3. The method of claim 1, further comprising encrypting the media object prior to streaming the media object to the distribution application.

4. The method of claim 1, further comprising monitoring bandwidth statistics of viewer devices connected to the distribution server system.

5. The method of claim 1, further comprising displaying a real-time monitoring dashboard on a webpage, the monitoring dashboard including statistics of viewer devices connected to the distribution server system.

6. A distribution server system comprising:
   a non-transitory memory comprising:
      a deployment module for providing a distribution application to a first viewer device for execution in a first browser application; and
      a schedule module for:
         receiving a media request for a media object from a second viewer device, and
         scheduling a portion of the media object from the first viewer device to be served to a sandboxed memory of a second browser application on the second viewer device; and
      a processor for executing the deployment module, the schedule module, or any combination thereof.

7. The system of claim 6, wherein the non-transitory memory further comprises a verification module, coupled to the schedule module, for verifying a registration of the second viewer device in response to receiving the media request.

8. The system of claim 6, wherein the non-transitory memory further comprises an encryption module, coupled to the schedule module, for encrypting the media object prior to streaming the media object to the distribution application.

9. The system of claim 6, wherein the non-transitory memory further comprises a monitor module for monitoring bandwidth statistics of viewer devices connected to the distribution server system.

10. The system of claim 6, wherein the non-transitory memory further comprises a monitor module for displaying a real-time monitoring dashboard on a webpage, the monitoring dashboard including statistics of viewer devices connected to the distribution server system.

* * * * *